US010888089B2

(12) United States Patent
Mora et al.

(10) Patent No.: US 10,888,089 B2
(45) Date of Patent: Jan. 12, 2021

(54) METHODS AND COMPOSITIONS FOR CONTROLLING FUNGUS-GROWING ANTS

(71) Applicant: UNIVERSITE PARIS EST CRETEIL VAL DE MARNE, Creteil (FR)

(72) Inventors: Philippe Mora, La Varenne Saint Hilaire (FR); Léonide Celini, Paris (FR)

(73) Assignee: UNIVERSITE PARIS EST CRETEIL VAL DE MARNE, Creteil (FR)

( * ) Notice: Subject to any disclaimer, the term of this patent is extended or adjusted under 35 U.S.C. 154(b) by 0 days.

(21) Appl. No.: 16/070,148

(22) PCT Filed: Jan. 13, 2017

(86) PCT No.: PCT/EP2017/050726
§ 371 (c)(1),
(2) Date: Jul. 13, 2018

(87) PCT Pub. No.: WO2017/121881
PCT Pub. Date: Jul. 20, 2017

(65) Prior Publication Data

US 2019/0021315 A1 Jan. 24, 2019

(30) Foreign Application Priority Data

Jan. 15, 2016 (FR) ..................................... 16 50318

(51) Int. Cl.

| | |
|---|---|
| ***A01N 31/08*** | (2006.01) |
| ***A01N 31/16*** | (2006.01) |
| ***A01N 35/02*** | (2006.01) |
| ***A01N 37/44*** | (2006.01) |
| ***A01N 59/02*** | (2006.01) |
| ***A01N 37/40*** | (2006.01) |
| ***A01N 65/24*** | (2009.01) |
| ***A01N 65/22*** | (2009.01) |
| ***A01N 37/38*** | (2006.01) |
| ***A01N 43/08*** | (2006.01) |
| ***A01N 43/22*** | (2006.01) |
| ***A01N 65/28*** | (2009.01) |
| ***A01N 25/00*** | (2006.01) |

(52) U.S. Cl.
CPC ........... *A01N 31/08* (2013.01); *A01N 25/002* (2013.01); *A01N 31/16* (2013.01); *A01N 35/02* (2013.01); *A01N 37/38* (2013.01); *A01N 37/40* (2013.01); *A01N 37/44* (2013.01); *A01N 43/08* (2013.01); *A01N 43/22* (2013.01); *A01N 59/02* (2013.01); *A01N 65/22* (2013.01); *A01N 65/24* (2013.01); *A01N 65/28* (2013.01)

(58) Field of Classification Search
CPC ...... A01N 31/08; A01N 25/002; A01N 31/16; A01N 35/02; A01N 37/38; A01N 37/40; A01N 37/44; A01N 43/08; A01N 43/22; A01N 59/02; A01N 65/22; A01N 65/24; A01N 65/28
See application file for complete search history.

(56) References Cited

U.S. PATENT DOCUMENTS

| | | | | |
|---|---|---|---|---|
| 2008/0193387 A1* | 8/2008 | De Wolff | A61K 36/23 424/47 |
| 2011/0135764 A1* | 6/2011 | Enan | A01N 65/00 424/745 |
| 2015/0368649 A1 | 12/2015 | Grossi De Sa et al. | |
| 2017/0094963 A1* | 4/2017 | Enan | A01N 65/00 |

FOREIGN PATENT DOCUMENTS

| | | | | |
|---|---|---|---|---|
| FR | 2655240 A1 | 6/1991 | |
| RO | 107544 B1 | 3/1996 | |
| WO | WO-2012/050857 A1 | 4/2012 | |
| WO | WO-2014047334 A1 * | 3/2014 | A01N 53/00 |
| WO | WO-2015127311 A1 * | 8/2015 | A01N 65/08 |

OTHER PUBLICATIONS

Currie et al., "Experimental evidence of a tripartite mutualism: bacteria protect ant fungus gardens from specialized parasites", OIKOS, 2003, 101(1):91-102.
De Fine Licht et al., "Laccase detoxification mediates the nutritional alliance between leaf-cutting ants and fungus-garden symbionts", Proceedings of the National Academy of Sciences, 2012, 110(2): 583-587.
PCT International Search Report and Written Opinion for PCT/EP2017/050726 dated May 8, 2017 (14 pages).
Bourbonnais et al., "Oxidation of Non-Phenolic Substrates: An Expanded Role for Laccase in Lignin Biodegradation", FEBS, vol. 267, No. 1, pp. 99-102, Jul. 1990.
Fisher et al., "Leaf Cutting Ants, Their Fungus Gardens and the Formation of Basidiomata of *Leucoagaricus Gongylophorus*", Mycologist, vol. 8, Part 3, pp. 128-131, Aug. 1994.
Lu et al., "Chemical and Molecular Mechanisms of Antioxidants: Experimental Approaches and Model Systems", J. Cell. Mol. Med., vol. 14, No. 4, pp. 840-860, 2010.

(Continued)

*Primary Examiner* — Robert A Wax
*Assistant Examiner* — Olga V. Tcherkasskaya
(74) *Attorney, Agent, or Firm* — Foley & Lardner LLP; Sunit Talapatra

(57) ABSTRACT

The invention relates to a method for fighting fungus-growing ants, and to a formicide composition capable of destroying specifically the colonies of fungus-growing ants. The invention also relates a kit for use with said method.

19 Claims, 1 Drawing Sheet

(56) References Cited

OTHER PUBLICATIONS

Mao et al., "Coverage Evaluation of Universal Bacterial Primers Using the Metagenomic Datasets", BMC Microbiology, vol. 12, No. 66, pp. 1-8, 2012.
North et al., "Evolutionary Aspects of Ants-Fungus Interactions in Leaf-Cutting Ants", Tree, vol. 12, No. 10, pp. 386-389, Oct. 1997.
Nunan et al., "Metabolizing Old Soil Carbon: Simply a Matter of Simple Organic Matter?", Soil Biology & Biochemistry, vol. 88, pp. 128-136, 2015.
Quinlan et al., "Aspects of the Symbiosis of the Leaf-Cutting and *Acromyrmex Octospinosus* (Reich) and its Food Fungus", Ecological Entomology, vol. 3, pp. 221-230, 1978.
Richard et al., "Digestive Capacities of Leaf-Cutting Ants and the Contribution of their Fungal Cultivar to the Degradation of Plant Material", J. Comp Physiol B, vol. 175, pp. 297-303, Aug. 2005.
Thurston, "The Structure and Function of Fungal Laccases", Microbiology, vol. 140, pp. 19-26, 1994.
Werner et al., "Über die Eigenshaften eines neuen Chromogens für die Blutzuckerbestimmung nach der GOD/POD-Methode", Z. Anal., Chem., vol. 252, pp. 224-228, 1970, English Abstract.
Williams et al., "Purification, Physicochemical Properties and Mode of Galactomannan Hydrolysis In Vitro", Biochem J., vol. 175, pp. 1069-1077, 1978.

* cited by examiner

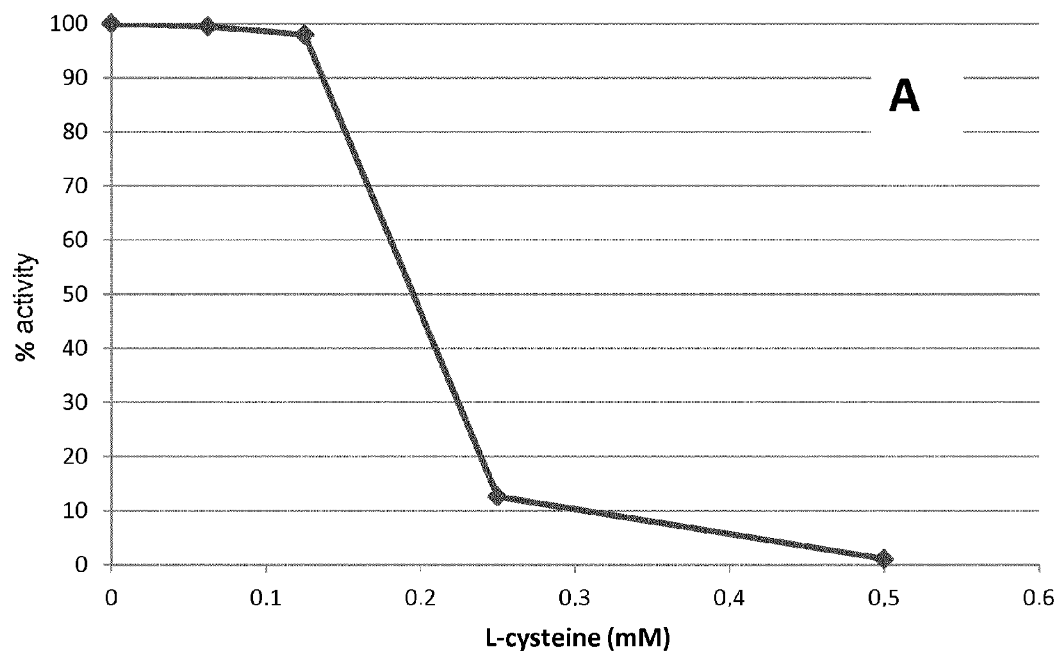
A
100
90
80
70
60
50
40
30
20
10
0
% activity
0
0.1
0.2
0.3
0.4
0.5
0.6
L-cysteine (mM)
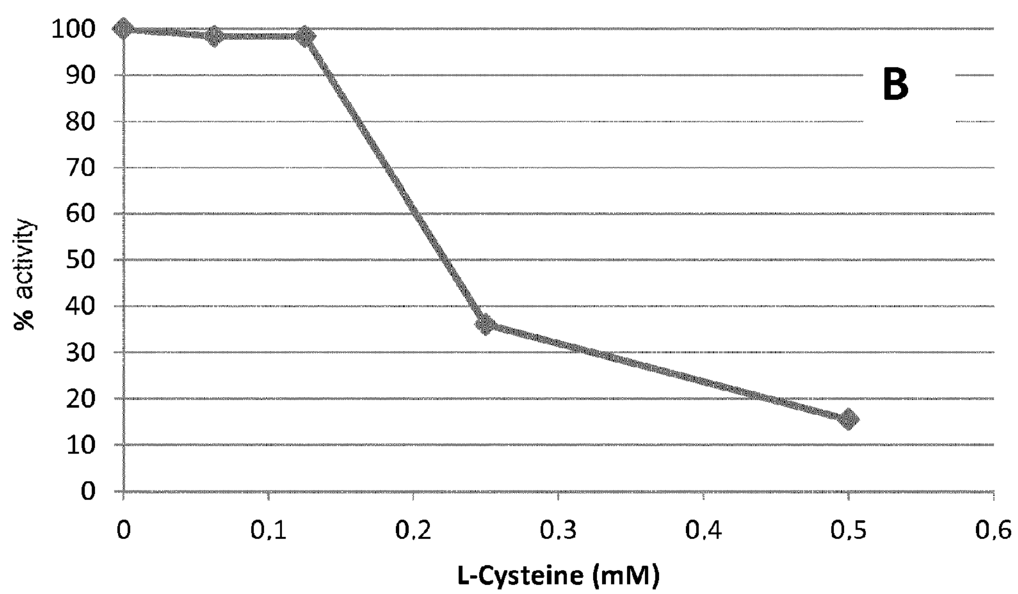
B
100
90
80
70
60
50
40
30
20
10
0
% activity
0
0,1
0,2
0,3
0,4
0,5
0,6
L-Cysteine (mM)

METHODS AND COMPOSITIONS FOR CONTROLLING FUNGUS-GROWING ANTS

CROSS-REFERENCE TO RELATED APPLICATIONS

This application is a U.S. national stage application of International Patent Application No. PCT/EP2017/050726, filed on Jan. 13, 2017, which claims priority to French Application No. 1650318, filed on Jan. 15, 2016, the content of each of these applications is incorporated herein by reference in its entirety.

FIELD OF THE INVENTION

The invention relates to the field of pest control. It proposes a novel method for controlling fungus-growing ants and a novel formicidal composition capable of specifically destroying the colonies of fungus-growing ants. The present invention also proposes a method for preparing such a composition or a kit which can be used in said method.

BACKGROUND

Fungus-growing "leaf-cutting" ants, belonging to the genus *Atta* or *Acromyrmex*, for example, are found mainly in Central and South America.

The main feature of the tribe Attini, which notably includes the genera *Atta* and *Acromyrmex*, is the fact that it cultivates, within the anthill itself, a saprophytic basidiomycete fungus of the species *Leucoagaricus gongylophorus*. The ants ensure its growth while the fungus provides nutrients for the colony by degrading complex molecules that cannot be assimilated by the ants (Richard et al., 2005). The fungus, fed raw material by the ants, can also constitute a nutrient source, since authors have observed that the fungus was consumed by certain ants (Qinlan et al., Aspects of the symbiosis of the leaf-cutting ant *Acromyrmex octospinosus* (Reich) and its food fungus. *Ecological Entomology* (1978) 3, 221-230 and, Fisher et al., Leaf cutting ants, their fungus gardens and the formation of basidiomata of *Leucoagaricus gongylophorus. Mycologist* (1994) 8, 3, 128-131)) and the fungus is a source of enzymes that degrade plant matter.

Fungus-growing "leaf-cutting" ants are an agricultural and forest crop pest. Indeed, they have no predator when they invade monocultures grown by man (a phenomenon which is accentuated with deforestation), which leads to a strong, uncontrolled presence. They collect leaves, flowers, fruits and seeds and thus devastate most agricultural crops: food crops (cassava, sweet potato, maize, breadfruit, etc.), fruit trees (lemon, orange, mango, avocado, etc.), vegetables (peppers, beans, lettuces, etc.) and ornamentals (roses, hibiscus, etc.). Damage caused by fungus-growing ants accounts for 30% of *eucalyptus* crop management costs in Brazil. A mature colony can destroy 3 tons of sugar cane per year, an estimated loss of 60 million dollars. In the United States, and more particularly in Texas, the annual damage is estimated at several million dollars, whereas it is several hundred million dollars in the state of Sao Paulo (Brazil).

The treatments used to control their spread, chiefly based on chemical pesticides, have led to soil pollution and deterioration. These compounds are now being gradually withdrawn from the market because they pose a risk to humans and the environment. Within the context of controlling *Acromyrmex octospinosus*, which began in the late 1950s, many chemicals (insecticidal organochlorine products) have been used. After aldrin (1,2,3,4,10,10-hexachloro-1,4,4a,5,8,8a-hexahydro-1,4-endo, exo-5,8-dimethanonaphthalene), which today is considered a persistent organic pollutant, 1,1a,2,2,3,3a,4,5,5,5a, 5b,6-dodecachlorooctahydro-1H-1,3,4-methanetriyl)cyclobuta[cd]pentalene sold under the trademark Mirex® was used before it, in turn, was banned because of its harmful environmental impact. Another product, called Blitz (fipronil), was used, but as its field of action was too broad, it was withdrawn from sale in Europe (2013) and is therefore no longer used.

The common feature of most of these insecticides was to target the nervous system of insects in general and not only that of fungus-growing ants. These nonspecific compounds thus affect other vulnerable species (e.g., bees). Furthermore, the action against the insect nervous system is generally rather rapid and targets the insect as such. However, against social insects, it is preferable to target the colony as a whole, notably via joint action against both the ants and their symbiotic fungus. Moreover, these conventional insecticidal compounds are generally poorly biodegradable and cause persistent toxic activity in soil and water.

Other means for controlling fungus-growing ants include fungicidal chemical compounds or pathogenic fungi (WO2012050857) targeting the ants (entomopathogens) or the fungus growing in the fungus garden (mycopathogen). Nevertheless, these solutions have not proved sufficiently effective. On the one hand the combination must be applied directly to the nest and on the other hand it has an efficacy of only 50% in 9-10 days.

Local means also include the use of repellent plants to keep fungus-growing ant nests away. However, such use is less effective and has no effect on the nest or the colony.

Currently there is no effective means of control and the problem of infestation by fungus-growing ants remains crucial.

Therefore, the objective of current research has been to find an innovative means of controlling fungus-growing ants that would be inexpensive, relatively harmless to the environment, and specific to these ants. In this context, the present invention proposes a novel method and associated composition directed at targeting the colony and its environment rather than the ant itself.

DETAILED DESCRIPTION

The inventors discovered that laccase is an enzyme widely expressed in fungus-growing ants and in the fungus garden and that a composition comprising a laccase inhibitor or having laccase inhibitory activity leads, within a few days, to the abandonment of nests located around the bait site. Moreover, in accordance with the present invention, a composition comprising a laccase inhibitor supplemented with an antibacterial compound having bactericidal or bacteriostatic activity against actinomycetes (or comprising a compound having laccase inhibitory activity and antibacterial activity against actinomycetes) can be used to destroy colonies around the bait site without colonies reappearing.

Since these novel methods for controlling ants and the associated compositions are specific to fungus-growing ants, they have less impact on the environment than conventional formicidal compositions. Moreover, in certain embodiments, these compositions are quickly degraded.

Unless otherwise specified, the scientific and technical terms used within the context of the present invention shall have the meanings commonly accepted by the person skilled in the art.

The term "fungus-growing ants" as used herein refers to ants belonging to the tribe Attini and in particular to the genus *Atta* or *Acromyrmex*. These ants have the feature of cultivating within the anthill itself a saprophytic basidiomycete fungus of the species *Leucophorus gongylophorus*. The ants ensure its growth while the fungus provides nutrients for the colony by degrading complex molecules. Within this family, ants belonging to the genus *Atta* or *Acromyrmex* form a subcategory called "leaf-cutting" ants. The most common species are *Acromyrmex heyeri, Acromyrmex echinatior, Acromyrmex lobicornis, Acromyrmex crassispinus, Acromyrmex laticeps, Acromyrmex striatus, Acromyrmex lundii, Acromyrmex octospinosus, Acromyrmex rugosus, Acromyrmex subterraneus brunneus, Acromyrmex subterraneus molestans, Acromyrmex subterraneus subterraneus, Acromyrmex volcanus, Acromyrmex balzani, Atta capiguara, Atta cephalotes, Atta colombica, Atta sexdens, Atta sexdens rubropilosa, Atta laevigata, Atta bisphaerica, Atta texana* and *Atta vollenweideri*.

For the purposes of the invention, the expression "controlling fungus-growing ants" corresponds herein to an action leading to abandonment of the nest or to destruction of the colony.

The terms "anthill" and "nest" can be used interchangeably herein. They correspond to the structure housing the colony of fungus-growing ants.

The term "colony" as used herein should be understood to mean a group of ants, other than a single pair and comprising at least one queen, building nests in which to raise offspring cooperatively.

The term "fungus garden" as used herein should be understood to mean the fungal structure cultivated by fungus-growing ants and composed mainly of the saprophytic basidiomycete fungus of the species *Leucophorus gongylophorus* growing on the plant matter harvested by the ants.

The expression "formicidal composition" as used herein should be understood to mean a composition formulated to specifically target ants. Thus, unlike an insecticidal composition, the formicidal composition of the invention will not cause the death of bees or other arthropods. The formicidal composition of the invention can cause abandonment of the nest by the colony of fungus-growing ants or destruction of said colony.

For the purposes of the invention, the expression "antibacterial compound" as used herein refers to a compound having bactericidal or bacteriostatic activity. The term "bactericidal activity" is used when the compound is capable of killing the bacterium, while the term "bacteriostatic activity" corresponds to inhibition of bacterial growth. A given antibacterial compound can have a bactericidal or a bacteriostatic effect on a given bacterial strain depending on its concentration.

The term "actinomycetes" should be understood to mean any bacterium belonging to the group of actinomycetes. Actinomycetes are generally aerobic Gram-positive bacteria. The actinomycetes most frequently found in relation to fungus-growing ants are *Pseudonocardia* and *Streptomyces*. Bacteria belonging to the genera *Gordonia, Tsukamurella, Amycolatopsis, Kribbella*, and *Nocardioides* can also be found.

The term "laccase" should be understood to mean polyphenol oxidase enzymes. These degrade lignin and provide protection against the toxicity of certain polyphenols. In enzyme nomenclature, laccases are grouped under code EC 1.10.3.2.

The expression "laccase inhibitor" or "compound having laccase inhibitory activity" should be understood to mean a compound that inhibits laccase activity as measured for example by the substrate ABTS (2,2'-azino-bis(3-ethylbenzthiazoline-6-sulphonic acid) according to the method published by Bourbonnais et al. (Oxidation of non-phenolic substrates. An expanded role for laccase in lignin biodegradation. *FEBS,* 1990, 267, 99-102).

"Antioxidant molecule" should be understood to have the common meaning given to this term, namely a molecule capable of decreasing or preventing oxidation of other chemical substances. The antioxidant potential of a molecule can be verified, for example, using ABTS radicals (Bourbonnais et al., Oxidation of non-phenolic substrates. An expanded role for laccase in lignin biodegradation. *FEBS,* 1990, 267, 99-102).

The term "feeding stimulant" or "bait" should be understood to mean a compound that has an attractive power on fungus-growing ants and thus increases the amount of the composition of the invention harvested by said ants. The term "carbohydrate feeding stimulant" should be understood to mean a molecule belonging to the carbohydrate family. The expression "oligosaccharide or polysaccharide feeding stimulant" should be understood to mean an oligosaccharide or polysaccharide molecule such as fructans, glucans, galactans, mannans or hemicelluloses, for example.

As shown in the examples, the inventors discovered that laccase is an enzyme widely expressed in fungus-growing ants and in the fungus garden and that a composition comprising a laccase inhibitor leads, within a few days, to abandonment of nests located around the location of the compositions or to destruction of these nests.

Such a method helps protect crops by preventing the development of nests around fields to be protected.

Thus, according to a first aspect, the invention relates to a method for controlling fungus-growing ants comprising the use of at least one laccase inhibitor.

A wide variety of laccase inhibitors exist. The skilled person can select a laccase inhibitor using routine tests such as that presented in the examples and based on the method published by Bourbonnais et al. (Oxidation of non-phenolic substrates. An expanded role for laccase in lignin biodegradation. *FEBS,* 1990, 267, 99-102).

In particular, a laccase inhibitor is any molecule that, within the context of the above-mentioned method, leads to a decrease in laccase activity of more than 50%, preferably of more than 75%, more preferably of more than 90%. Preferably, these inhibitions of laccase activity are obtained at concentrations below 5 mM. Even more preferably, these inhibitions of laccase activity are obtained at concentrations below 1 mM.

All antioxidant molecules have the ability to inhibit laccase activity. Nevertheless, certain laccase inhibitors do not have antioxidant activity. Examples of molecules that have anti-laccase activity and are not antioxidant molecules include chelators, detergents, non-oxidising organic acids, and cationic metals.

For example, the following molecules also have anti-laccase activity without being antioxidant molecules: ethylenediaminetetraacetic acid (EDTA), calcium chloride ($CaCl_2$)), rhodotorulic acid, enterobactin, thioglycolic acid, diethyldithiocarbamic acid, sodium azide, cetyltrimethylammonium bromide, $Fe^{2+}$, $Cu^{2+}$, $Ag^{+}$, $Li^{+}$, $Sn^{+}$, $Hg^{+}$, $Mn^{2+}$, $Zn^{2+}$, $Al^{3+}$, sodium lauryl sulphate, sodium cyanide (NaCN), sodium thiosulphate, oxalic acid, beta-mercaptoethanol.

Thus, typically, the method for controlling fungus-growing ants comprises the use of at least one laccase inhibitor selected from an antioxidant molecule, a chelator, a detergent, a non-oxidising organic acid, and a cationic metal.

The preferred molecules for use as a laccase inhibitor are: for chelators: EDTA, rhodotorulic acid, enterobactin for detergents: sodium lauryl sulphate, for cationic metals: $Fe^{2+}$, $Cu^{2+}$, $Ag^{+}$, $Li^{+}$, $Sn^{+}$, $Hg^{+}$, $Mn^{2+}$, $Zn^{2+}$, $Al^{3+}$, for non-oxidising organic acids: oxalic acid, thioglycolic acid, diethyldithiocarbamic acid.

Preferably, the laccase inhibitor is an antioxidant molecule.

Such antioxidant molecules are generally known to the skilled person (Lü et al. 2010), who will also be able to verify this activity using conventional tests for measuring antioxidant potential such as that described in Bourbonnais et al. (Oxidation of non-phenolic substrates. An expanded role for laccase in lignin biodegradation. *FEBS,* 1990, 267, 99-102).

Molecules having anti-laccase activity and antioxidant activity can for example be selected from ascorbic acid (E300), citric acid (E330), coumaric acid, ferulic acid, gallic acid, 6-1-palm itylascorbic acid (E304), syringic acid, sodium/calcium/potassium ascorbates (E301/E302/E303), butylhydroxyanisole (BHA), butylhydroxytoluol, cysteine, octyl gallate (E311) or dodecyl gallate (E312), glutathione, sodium lactate (E325), potassium lactate (E326) or calcium lactate (E327), lecithins (E322), lipoate, carotenoids (E160) such as lutein, luteolin, carotenes such as lycopene, sodium tartrate (E335), potassium tartrate (E336) or sodium and potassium tartrate (E337), sodium thiosulfate, vitamin E (natural tocopherols (E306)), synthetic α-tocopherol (E307), synthetic γ-tocopherol (E308) and synthetic δ-tocopherol (E309), selenium and hydroxylammonium chloride.

In particular, the laccase inhibitor is selected from one of the following compounds: ascorbic acid, citric acid (E330), coumaric acid, 6-1-palmitylascorbic acid (E304), sodium/calcium/potassium ascorbates (E301/E302/E303), cysteine, octyl gallate (E311) or dodecyl gallate (E312), glutathione, sodium lactate (E325), potassium lactate (E326) or calcium lactate (E327), lecithins (E322), carotenoids (E160) such as lutein, luteolin, carotenes such as lycopene, sodium tartrate (E335), potassium tartrate (E336) or sodium and potassium tartrate (E337), sodium thiosulfate, vitamin E (natural tocopherols (E306)), synthetic α-tocopherol (E307), synthetic γ-tocopherol (E308) and synthetic δ-tocopherol (E309), selenium and hydroxylammonium chloride.

The laccase inhibitor preferably has little impact on the environment and is rapidly degraded. Therefore, preferably, the laccase inhibitor is selected from one of the following compounds: ascorbic acid, sodium/calcium ascorbates (E301/E302), sodium lactate (E325), potassium lactate (E326) or calcium lactate (E327), lutein, lycopene, sodium tartrate (E335), potassium tartrate (E336) or sodium and potassium tartrate (E337), sodium thiosulfate, vitamin E (natural tocopherols (E306)), synthetic α-tocopherol (E307), synthetic γ-tocopherol (E308) and synthetic δ-tocopherol (E309), cysteine and glutathione.

As used herein, the letter "E" followed by three numbers is a part of the International Numbering System for Food Additives (INS) which is a European-based naming system for food additives, defined by Codex Alimentarius, the international food standards organization of the World Health Organization (WHO) and the Food and Agriculture Organization (FAO) of the United Nations. The nomenclature is published in the document "Class Names and the International Numbering System for Food Additives."

Preferably, the laccase inhibitor is selected from one of the following compounds: L-cysteine, coumaric acid, glutathione, sodium thiosulfate, ferulic acid, syringic acid, ascorbic acid, gallic acid.

In addition, the preferred molecules are natural or easily degradable and are thus environmentally friendly, unlike the most common insecticides. Therefore, even more preferably, the laccase inhibitor is selected from one of the following compounds: L-cysteine, glutathione, sodium thiosulfate, ferulic acid, syringic acid, ascorbic acid, gallic acid.

Particularly preferably, the laccase inhibitor is selected from L-cysteine, ascorbic acid, sodium thiosulfate or glutathione.

This laccase inhibitor is used at a concentration sufficient to lead to inhibition of the activity of laccases present in the fungus garden and in the ants.

This concentration can be determined by the skilled person using conventional tests for evaluating the minimum inhibitory concentration, such as those used in the examples.

Thus, typically, the method for controlling fungus-growing ants according to the invention comprises at least the use of a laccase inhibitor selected from glutathione, L-cysteine, sodium thiosulfate and ascorbic acid.

As shown in the experimental section, the use of a composition comprising a laccase inhibitor is sufficient to destroy the ant nest by causing the fungus garden and the colony to disappear. In certain cases, the use of a composition comprising at least one laccase inhibitor leads to the abandonment of the nest but a new nest may be rebuilt near the abandoned nest. The inventors have also isolated numerous actinomycetes from the cuticle of fungus-growing ants. Following these observations, they showed that a composition comprising at least one laccase inhibitor supplemented with at least one antibacterial compound having bactericidal or bacteriostatic activity against actinomycetes can be used to destroy colonies around the bait site without colonies reappearing. Thus, the addition of at least one antibacterial compound increases the effect of the laccase inhibitor and affects the fungus garden, thus leading to destruction of the colony.

Thus, the combination of a laccase inhibitor with an antibacterial molecule having bactericidal and/or bacteriostatic activity against actinomycetes can be used on the one hand to optimise the disappearance of the colony and on the other hand to avoid the appearance of new colonies. This is especially true when the treatment is applied before swarming. Indeed, destruction of the nest will not allow the flight (swarming) of colony-founding winged ants, thus limiting their spread.

While the laccase inhibitor used individually can control fungus-growing ants (e.g., nest abandonment) without destroying the colony, the combination of these two compounds results in destruction of the colony. This action is also specific to fungus-growing ants and will have little or no impact on the environment.

Therefore, preferably, the invention relates to a method for controlling fungus-growing ants comprising the use of at least one laccase inhibitor and at least one antibacterial compound or compound having laccase inhibitory activity and antibacterial activity.

Surprisingly, the inventors observed that the use of an antibacterial molecule having bactericidal and/or bacteriostatic activity against actinomycetes can destroy the nest of fungus-growing ants.

Thus, in a particular embodiment, the invention relates to a method for controlling fungus-growing ants comprising the use of at least one antibacterial molecule having bactericidal and/or bacteriostatic activity against actinomycetes.

There exists a very wide variety of antibacterial compounds active against actinomycetes. There exist routine tests for detecting and quantifying this activity, such as those presented in the examples (Petri dish antibiogram, namely impregnated discs on agar), which can be performed on collection actinomycete strains (e.g., ATCC23345, ATCC19727) or on strains directly isolated from fungus-growing ants (see examples).

In particular, the invention is characterised in that the antibacterial compound is an antibiotic.

More particularly, the antibiotic can be selected from the following antibiotic classes: β-lactamines, aminoglycosides, macrolides and related compounds, glycopeptides, tetracyclines and quinolones. For example, this antibiotic can be selected from the following list: chloramphenicol, erythromycin, josamycin, tetracycline, gentamicin, streptomycin, and penicillin.

Furthermore, the inventors have identified natural plant compounds having bacteriostatic or bactericidal activity against actinomycetes isolated from the ant cuticle.

These natural plant-derived compounds have the advantage of being rapidly degraded and, for the most part, have bactericidal or bacteriostatic activity against the targeted actinomycetes as strong as that of an antibiotic. Moreover, the preferred molecules are natural or easily degradable and thus are environmentally friendly, unlike the most common insecticides or antibacterials.

Preferably, the antibacterial compound used is not an antibiotic used in therapy (human or animal). The exclusion of such an antibiotic is intended to limit the potential emergence of resistance having an impact on therapeutic strategies.

Preferably, the antibacterial compound used is a natural molecule extracted from plants. This antibacterial compound is used pure or may be present in a mixture of compounds in an essential oil.

Therefore, more particularly, the invention is characterised in that the antibacterial compound is selected from the following list: carvacrol, thymol, eugenol, cinnamaldehyde, α-terpineol, terpinen-4-ol.

Preferably, the antibacterial compound is selected from the following list: carvacrol, thymol, eugenol and cinnamaldehyde.

The antibacterial compound according to the invention can also be characterised in that it consists of an essential oil selected from the essential oils from the following plants: oregano, marjoram, thyme, clove, cinnamon, tea-tree (*Melaleuca alternifolia*), pine, geranium, lemon, lemongrass and garlic.

Preferably, the antibacterial compound is selected from the following list of essential oils: oregano, thyme, clove and cinnamon.

This antibacterial compound is used at a concentration sufficient to lead to bactericidal and/or bacteriostatic activity against actinomycetes present in the fungus garden and on the ants. This concentration can be determined by the skilled person using conventional tests for evaluating minimum inhibitory concentration or minimal bactericidal concentration, such as those used in the examples.

Quite surprisingly, anti-laccase activity was observed for the antibacterial compounds eugenol and thymol. These two compounds are thus of particular interest for the compositions of the invention because, having both laccase inhibitory activity and antibacterial activity, they can act on the two targets identified by the inventors for controlling fungus-growing ants.

Preferentially, the compounds of the invention having laccase inhibitory activity and antibacterial activity are selected from thymol and eugenol.

In another particular embodiment, the invention relates to a method for controlling fungus-growing leaf-cutting ants belonging to the genus *Atta* or *Acromyrmex* comprising the use of at least one laccase inhibitor.

In another particular embodiment, the invention relates to a method for controlling fungus-growing leaf-cutting ants belonging to the genus *Atta* or *Acromyrmex* comprising the use of at least one antibacterial molecule having bactericidal and/or bacteriostatic activity against actinomycetes.

Moreover, the skilled person knows how to prepare such formicidal compositions, and the compositions or methods of the invention can function with one or several laccase inhibitors preferably in combination with one or several antibacterial compounds.

Particularly preferably, the invention relates to a method for controlling fungus-growing ants comprising the use of a formicidal composition comprising at least one compound or a combination of compounds selected from:

thymol and L-cysteine,
eugenol and L-cysteine,
cinnamaldehyde and L-cysteine,
thymol and sodium thiosulfate,
eugenol and sodium thiosulfate,
cinnamaldehyde and sodium thiosulfate,
thymol and glutathione,
eugenol and glutathione,
cinnamaldehyde and glutathione,
thymol,
eugenol,
cinnamaldehyde,
sodium thiosulfate,
L-cysteine, and
glutathione.

The inventors have also shown that the addition of an oligosaccharide or polysaccharide feeding stimulant to a formicidal composition as described above makes it possible to attract fungus-growing ants more effectively.

Thus, according to another aspect, the invention relates to a method for controlling fungus-growing ants comprising the use of at least one oligosaccharide or polysaccharide feeding stimulant.

Advantageously, the invention relates to a method for controlling fungus-growing ants comprising the use of at least one oligosaccharide or polysaccharide feeding stimulant in combination with at least one laccase inhibitor alone or in combination with at least one antibacterial compound.

The respective concentrations of each compound of the composition of the invention are indicated below and, as a function of the final composition of the composition of the invention, may be cumulative.

According to a particular aspect, the invention relates to a method for controlling fungus-growing leaf-cutting ants belonging to the genus *Atta* or *Acromyrmex* comprising the use of at least one oligosaccharide or polysaccharide feeding stimulant in combination with at least one laccase inhibitor alone or in combination with at least one antibacterial compound.

In particular, the oligosaccharide or polysaccharide feeding stimulant can be selected from starch, amylose, amylopectin, cellobiose, glycogen, glucose, sucrose, laminarin ((1-3)-beta-D-glucan), maltodextrin, cyclodextrin polymers, isomaltose polymers, icodextrins, dextran, maltoheptose, maltohexose, maltopentose, maltotetrose, maltotriose, maltobiose and derivatives thereof.

Preferably, the oligosaccharide or polysaccharide feeding stimulant is selected from starch, amylose, cellobiose, laminarin, maltodextrin, maltobiose, glucose, sucrose and glycogen.

Particularly preferably, the oligosaccharide or polysaccharide feeding stimulant is selected from starch, amylose, laminarin, maltodextrin and glycogen.

Even more preferably the feeding stimulant is starch.

In a particular embodiment, the feeding stimulant is itself in the form of a composition and constitutes the majority element thereof. For example, starch is the main compound of wheat flour. The skilled person will easily be able to choose the most appropriate form of the feeding stimulants.

Typically, the concentration of feeding stimulant is notably a function of the presence and the amount of laccase inhibitor and/or antibacterial agent. Thus, the amount of feeding stimulant is between 600 g/kg and 999 g/kg; preferably between 800 g/kg and 999 g/kg, preferably between 850 g/kg and 990 g/kg, or even between 870 g/kg and 950 g/kg of the formicidal composition of the invention.

The inventors have shown that a formicidal composition comprising at least one laccase inhibitor or at least one antibacterial compound or a combination of at least one laccase inhibitor and at least one antibacterial compound can destroy colonies of fungus-growing ants.

Thus, according to another aspect, the invention relates to a formicidal composition comprising at least one laccase inhibitor or at least one antibacterial compound or a combination of at least one laccase inhibitor and at least one antibacterial compound as compounds active against fungus-growing ants. Preferably, these two compounds are the only compounds active against fungus-growing ants.

For the composition of the invention, the antibacterial compounds and the laccase inhibitors are the same (including the preferred compounds) as those described above relative to the method of the invention.

Typically, the concentration of antibacterial compound is between 1 g/kg and 200 g/kg of the formicidal composition of the invention. Preferably, it is between 10 g/kg and 150 g/kg and more preferably between 50 g/kg and 120 g/kg of formicidal composition of the invention.

Typically, the concentration of laccase inhibitor is between 1 g/kg and 200 g/kg of the formicidal composition of the invention. Preferably, it is between 10 g/kg and 150 g/kg and more preferably between 50 g/kg and 120 g/kg of formicidal composition the invention.

Of course, these concentrations can be determined by the skilled person using conventional tests for evaluating the minimum concentration, such as those used in the examples.

The composition of the invention can be a combination product of at least one laccase inhibitor and at least one antibacterial compound for simultaneous, separate or sequential use.

Advantageously, the composition of the invention may comprise at least one compound having both inhibitory activity on ant and fungus garden laccases and bactericidal and/or bacteriostatic activity against actinomycetes present in the fungus garden and on the ants. The skilled person will easily know, based on the method published by Bourbonnais et al. (Oxidation of non-phenolic substrates. An expanded role for laccase in lignin biodegradation. *FEBS,* 1990, 267, 99-102) mentioned above and used in the experimental section, how to identify the bactericidal and/or bacteriostatic compounds that have an inhibitory activity on ant and fungus garden laccases and can be used against actinomycetes present in the fungus garden and on the ants.

The composition of the invention may also comprise at least one feeding stimulant. Preferably, the feeding stimulant is a carbohydrate feeding stimulant.

The feeding stimulant is more preferably selected from the oligosaccharide or polysaccharide feeding stimulants described above relative to the method of the invention (including the preferred compounds).

Thus preferably, the invention relates to a formicidal composition as described above comprising starch as polysaccharide feeding stimulant.

Particularly preferably, the invention relates to a formicidal composition comprising starch as polysaccharide feeding stimulant and at least one compound or a combination of compounds selected from:

thymol and L-cysteine,
eugenol and L-cysteine,
cinnamaldehyde and L-cysteine,
thymol and sodium thiosulfate,
eugenol and sodium thiosulfate,
cinnamaldehyde and sodium thiosulfate,
thymol and glutathione,
eugenol and glutathione,
cinnamaldehyde and glutathione,
thymol,
eugenol,
cinnamaldehyde,
sodium thiosulfate,
L-cysteine, and
glutathione.

It is not necessary to add to the formicidal composition compounds toxic to fungus-growing ants.

Thus, typically, the formicidal composition of the invention does not comprise compounds targeting the insect nervous system (e.g., fipronil).

Unlike conventional insecticides or form icides, the composition of the invention is specific to fungus-growing ants.

Thus, its use is envisaged in a method for controlling fungus-growing ants and more particularly for destroying colonies of fungus-growing ants.

Unlike other insecticides or formicides, this composition does not have an immediate effect. Moreover, particularly advantageously, the compositions of the invention are free of repellent effect. Owing to this “delay” effect and to the lack of repellent effect, the composition is thus not necessarily dispersed on the colony. It can be placed in fields to be protected or on foraging columns. The fungus-growing ants will carry the composition to the nest where it will come into contact with the entire colony and fungus. In this embodiment, the use of a feeding stimulant is particularly advantageous.

The composition of the invention can be dispersed directly on or around the nest when the latter is localised (e.g., within 5 metres), or preferably near foraging columns (e.g., within 2 metres).

The composition of the invention can be dispersed all at once on or around the nest or near foraging columns. In a particular embodiment, the composition of the invention is dispersed regularly, in several applications, on or around the nest or near foraging columns. Typically, the dispersions can be daily, or spaced 2, 3, 4, 5 or 6 days apart, or one, two or three weeks apart.

The method of the invention may comprise the dispersion of 20 g to 500 g of formicidal composition of the invention per day.

The method of the invention may comprise the dispersion of 10 g to 100 g of formicidal composition of the invention per day, over 5 to 30 consecutive days.

The method of the invention may also comprise the dispersion of 100 g to 500 g, preferentially of 200 g to 500 g, of formicidal composition of the invention all at once.

FIGURES

FIG. 1 shows a measurement of the anti-laccase activity of L-cysteine on a fungus garden sample (A) and an ant sample (B).

EXAMPLES

1. Materials and Methods 1.1. Measurement of Enzyme Activity 1.1.1 Sampling and Storage From a total of 18 nests, samples of fungus gardens and of ants were collected and stored at −20° C.

1.1.2. Obtaining Enzyme Extracts

Crushing was performed in mortars placed on ice, using pestles. Ants (2 g) and fungus garden (2 g) were crushed in 10 mL of distilled water refrigerated at 4° C. After obtaining crushed matter of homogeneous texture, the whole was centrifuged. Centrifugation was performed at 4° C., 15,000 rpm for 20 min.

For protein precipitation, the supernatant was 80% saturated with ammonium sulphate ($(NH_4)_2SO_4$). After total dissolution of the ammonium sulphate, the solution obtained is placed at 4° C. for 12 hours. The solution was then centrifuged at a temperature of 4° C., at 15,000 rpm, for 20 min. The pellet obtained is redissolved in a minimum of cold distilled water and then dialysed against 5 litres of distilled water at 4° C. for 12 hours. The extract thus obtained constitutes the crude enzyme extract. These extracts were aliquoted and then stored at −20° C.

1.1.3. Enzyme Substrates Analysed

Enzyme activity was evaluated in relation to the degradation capacity of 16 substrates:

- five natural oligosaccharides (cellobiose, gentiobiose, lactose, maltose, sucrose);
- six synthetic heterosides (PNP-α- and -β-glucopyranosides, PNP-α- and -β-galactopyranoside, PNP-β-xyloside and PNP-N-acetyl-glucosamine);
- four polysaccharides (starch, carboxymethylcellulose (CMC), pullulan and xylan).

1.1.4. Enzyme Analyses

Enzyme solutions were incubated with substrates at 37° C. for 30 min in McIlvain buffer solution (pH 5.2). All enzyme and control assays were performed in 3 replicates to ensure repeatability of the results. To express the results, the average of the three repetitions was taken into account.

Oligosaccharidase activity was determined by the glucose oxidase (GOD) assay method according to Werner et al. (Chem. (1970) 252, 224-228).

Heterosidase activity was indirectly evaluated by measuring the amount of para-nitrophenol (PNP) released, according to the method described by Nunan et al. (Metabolising old soil carbon: Simply a matter of simple organic matter, *Soil Biology & Biochemistry* 88 (2015) 128-136).

The reduced sugars produced by polysaccharide hydrolysis are assessed by the Somogyi-Nelson microassay method with the cupro-alkaline reagent (Williams et al., α-Galactosidases II, III and IV from Seeds of *Trifolium repens*. (1978) *Biochem. J.* 175, 1069-1077).

Laccase activity was evaluated using 2,2'-azino-bis(3-ethylbenzthiazoline-6-sulphonic acid) (ABTS) as oxidation control substrate. Briefly, ABTS is diluted to 27.4 mg/L in McIlvain buffer solution (pH 5.2). 150 μL of ABTS solution is incubated with 100 μL of test solution and then incubated for 30 min at 37° C. The measurement of OD at 405 nm is used to determine the amount of oxidised ABTS using Beer-Lambert's law (epsilon=36,000 mM).

Proteins are assayed by a colorimetric assay for measuring total protein concentration Based on the color change of Coomassie brilliant blue G-250 dye in response to various concentrations of protein, sold under the trademark Bio-Rad® reagent method. Bovine serum albumin was used to prepare the standards.

1.1.5. Laccase Inhibition

The determination of laccase activity is based on a colorimetric method where the substrate ABTS (2,2'-azino-bis(3-ethylbenzthiazoline-6-sulphonic acid) in reduced form (colourless) is oxidised (green colour) in the presence of the enzyme. The method was published by Bourbonnais et al. in 1990 (Oxidation of non-phenolic substrates. An expanded role for laccase in lignin biodegradation. *FEBS,* 1990, 267, 99-102). To test the inhibition of laccase activity, the molecule tested is added to the reaction mixture in amounts ranging from 0.1 mM to 100 mM. The inhibitors selected for analysis are compounds having antioxidant capacity.

1.2. Evaluation of Antibacterial Activity 1.2.1. Collection

Bacterial strains adhering to the ant cuticle were collected using a dispersant solution corresponding to a 0.9% NaCl solution containing 10% polysorbate 80 or also called polyoxyéthylène (20) sorbitan monooleate sold under the trade mark Tween 80®.

1.2.2. Isolation

Actinomycete strains were isolated by successive plating on NA (composition: 2.5 g $K_2HPO_4$; 0.5 g sodium nitrate; 7.5 g agar; 2 g N-acetyl-glucosamine; qs 500 mL; pH 6.5) or PCA (composition: 5.0 g casein peptone; 2.5 g yeast extract; 1.0 g D(+)-glucose; 14.0 g agar; qs 1000 mL, pH 7) and morphology verification by optical microscopy.

1.2.3. Verification of Strain Identity 1.2.3.1. DNA Extraction

Strains isolated from the external surface of ant bodies and selected were reactivated in 9 mL of culture medium (5 g peptone; 2.5 g yeast extract and 1 g glucose).

The culture was incubated with shaking at 27° C. overnight. After bacterial growth, 2 mL culture samples were taken from each sample and placed respectively in Eppendorf tubes and then centrifuged at 10,000 g for 10 min. Bacterial lysis was performed using high-speed, digitally controlled benchtop homogenizer sold under the trademark FastPrep®-24 (MP Biomedicals) and the "PowerBead" tubes included in the kit. The conditions were as follows: frequency 4.0 $ms^{-1}$, time 45 s. The aqueous solution of guanidine thiocyanate and garnet particles sold under the trademark PowerSoil DNA Isolation Kit (Mobio Laboratories) was used to extract total DNA from the pellets obtained after centrifugation. The protocol used is that recommended by the supplier. The DNA was eluted in 70 μL of Tris-HCl buffer provided with the kit. The concentration of total DNA extracted was determined by spectrophotometry using the microvolume UV-Vis Spectrophotometer, sold under the trademark NanoDrop®, and stored at −20° C. before subsequent analyses.

1.2.3.2 Amplification of a 16S rRNA Gene Region Specific to Bacteria

A region specific to the bacteria-specific 16S rRNA gene was amplified by PCR under the following conditions:

The primers used were 27F and 1390R (Mao et al. 2012). The amplicons were verified by 1% agarose gel electrophoresis (weight/volume of 0.5×TAE buffer) containing 0.5×

SYBR Safe. The presence of bands was visualised by exposing the gel to ultraviolet (UV) light.

1.2.3.3. Sequencing and Phylogenetic Affiliation of Strains

Sanger sequencing of amplicons was performed by Beckman Coulter Genomics. BioEdit software was used to align the sequences obtained. Comparison between these sequences and those available in the databases was performed using BLAST software on NCBI.

1.2.4. Measurement of Antibacterial Activity Using Discs in Petri Dishes

The general principle is to test in solid medium the culture of the strain in the presence of a paper disc impregnated with the molecule to be tested. For each molecule tested at least three dilutions were prepared. In the presence of a molecule, a halo, the diameter of which is related to the intensity of the inhibitory effect, appears around the paper disc. This approach provides a simple way to select antibacterial molecules and to determine the minimum inhibitory concentration (MIC) of bacterial growth.

Antibacterial activity can be measured in liquid medium (in a liquid bacterial culture) or in solid medium (on an agar Petri dish) by adding a known concentration of antibiotic. In liquid medium, inhibition is measured by an optical density (OD); in solid medium, growth inhibition is estimated by the diameter of the halo corresponding to the zone where no growth is observed.

From the isolates, a sample is taken. This is suspended in 1 mL of physiological saline solution without measuring OD.

Inoculation is performed with 100 μL of suspension using a spreader. For undiluted essential oil tests, a disc soaked in essential oil is placed in the centre of the dish. For dilutions (½; ⅕), both discs are placed in the same dish. Dilutions were prepared by diluting the essential oils in sunflower oil. A control dish was prepared and consists of an inoculate in the absence of essential oil. A second control, this time with a disc impregnated with sunflower oil, was also prepared to confirm the absence of an effect. All products were sterilised and the experiments were performed under a hood in sterile conditions.

After 4 days of growth, the inhibition diameters were measured.

Erythromycin was used for this study and the study concerning the use of molecules.

Erythromycin is a macrolide antibiotic with a similar or slightly broader antimicrobial spectrum than penicillins. This molecule serves as a reference.

1.3. Evaluation of Efficacy Against Fungus-Growing Ants Over 14 Days.

1.3.1. Preparation of the Composition

The pellets (or bait) were prepared by incorporating 10% sodium thiosulphate or ascorbic acid into a wheat flour paste. The paste thus obtained was transformed into a pellet in the shape of a grain of rice. These pellets were then dried in an oven at a maximum temperature of 28° C.

1.3.2. Tests Against Fungus-Growing Ants 1.3.2.1. Anti-Laccase

Initial tests were performed to acquire initial data concerning the use of pellets impregnated with various laccase inhibitors.

The nests are visited for the first time 2 days after the pellets are deposited, and then at 4, 6, 8, 9, 10, 12 and 14 days. Observation is made of the presence or absence of pellets (10 g) which, placed in a small plastic bag, were deposited near a dome. At each visit the bag is replaced whether or not the pellets were harvested by the ants. Pellets impregnated with ascorbic acid or sodium thiosulfate are alternated during each visit.

A colony activity test is performed using a wooden rod. The latter is inserted into the ground at various points around the cone; a lack of resistance means that the rod is inserted into the cavity containing the fungus garden. Within a few seconds several tens of ants disturbed by the insertion of the rod into the fungus garden cavity climb up the rod, thus attesting to the vitality of the colony.

1.3.2.2. Anti-Laccase+Antibacterial

The pellets may also contain a mixture of anti-laccase and antibacterial molecules.

1.4. Evaluation of Efficacy Against Fungus-Growing Ants Over Several Months.

1.4.1. Experimental Sites.

An in situ experiment was conducted in the French West Indies, on 44 nests.

1.4.2. Compositions Tested.

Several compositions of the invention were tested:

thymol and L-cysteine,
eugenol and L-cysteine,
cinnamaldehyde and L-cysteine,
thymol and sodium thiosulfate,
eugenol and sodium thiosulfate,
cinnamaldehyde and sodium thiosulfate,
thymol and glutathione,
eugenol and glutathione,
cinnamaldehyde and glutathione,
thymol,
eugenol,
cinnamaldehyde,
sodium thiosulfate,
L-cysteine, and
glutathione.

The compositions were prepared as mentioned in section 1.3.1. Each active compound represented 10% of the composition (by weight of the composition), the remainder being wheat flour paste.

Each of the above-mentioned compositions was tested on two or three nests. At each nest, 5 bags each containing 25 g of one of the above-mentioned compositions were deposited at the same time.

2. Results 2.1. Measurement of Enzyme Activity

Results of enzyme activity measurements are presented in Table 1.

TABLE 1

Enzyme activities measured in the fungus-growing ant *Acromyrmex octospinosus* and the fungus *Leucophorus gongylophorus*

| | Ant | Fungus |
|---|---|---|
| Oligosaccharidases (μg glucose min$^{-1}$ mg$^{-1}$ protein) | | |
| Cellobiase | 41.3 | 4.5 |
| Gentiobiase | 62.4 | 8.8 |
| Lactase | 12.0 | 5.0 |
| Maltase | 988.7 | 5.2 |
| Sucrase | 790.7 | 0.9 |
| Heterosidases (μg phenol min$^{-1}$ mg$^{-1}$ protein) | | |
| α-Galactosidase | 48.5 | 14.2 |
| β-Galactosidase | 12.0 | 10.3 |
| α-Glucosidase | 2706.5 | 9.3 |
| β-Glucosidase | 46.9 | 12.9 |

TABLE 1-continued

| Enzyme activities measured in the fungus-growing ant *Acromyrmex octospinosus* and the fungus *Leucophorus gongylophorus* | | |
|---|---|---|
| | Ant | Fungus |
| β-Xylosidase | 22.1 | 14.0 |
| N-Acetyl-glucosaminidase | 23.5 | 3.2 |
| Polysaccharidase ($\mu$g glucose equivalent $min^{-1}$ $mg^{-1}$ protein) | | |
| Amylase | 385.6 | 26.5 |
| Cellulase | 75.9 | 1.7 |
| Pullulanase | 14.1 | 0.8 |
| Xylanase | 96.6 | 13.1 |
| Phenol oxidase ($\mu$g fluorescein $min^{-1}$ $mg^{-1}$ protein) | | |
| Laccase | 38830.5 | 8538.1 |

The major result of this enzyme screening is the demonstration of very high laccase activity both in the fungus garden and in the ants. Indeed, this enzyme represents more than 90% of all measured activities. Laccases or polyphenol oxidases catalyse the oxidation of phenolic substances (Thurston, The structure and function of fungal laccases, *Microbiology* (1994) 140, 19-26). In fungi, laccases, in addition to their oxidative action on polyphenolic compounds (involvement in the degradation of lignin), also play a detoxifying role with respect to plant defence substances.

The results of the glycosidase spectrum study show that the ants' spectrum is characterised by amylolytic activity. Thus, the ants' maltase (starch dimer) activity is not only very much higher than that detected in the fungus garden but it is also one of the majority enzymes. The same applies to the activities measured on α-glucoside. These high starch degradation activities are confirmed by high amylase activities. Starch therefore appears as an important carbon source for *Acromyrmex octospinosus*, contrary to what can be observed in the fungus garden.

2.2. Measurement of Anti-Laccase Activity

Results of anti-laccase activity measurements on ant or fungus garden samples are presented in Table 2.

TABLE 2

| | $IC_{50}$ *Acromyrmex octospinosus* | $IC_{50}$ *Leucophorus gongylophorus* |
|---|---|---|
| L-Cysteine | <0.25 mM | <0.25 mM |
| Coumaric acid | <0.25 mM | <0.25 mM |
| Sodium thiosulfate | <0.25 mM | <0.25 mM |
| Ferulic acid | <0.1 mM | <0.05 mM |
| Syringic acid | <0.25 mM | <0.1 mM |
| Ascorbic acid | <0.25 mM | <0.25 mM |
| Gallic acid | <0.05 mM | <0.05 mM |

The results of inhibition of the laccase activity present in the ants show that the listed compounds inhibit at least 50% of the laccase activity of *Acromyrmex octospinosus* and of *Leucophorus gongylophorus* at concentrations below 0.25 mM.

Moreover, L-cysteine, at concentrations above 0.5 mM, inhibits more than 80% of the activity (FIG. 1). Ascorbic acid and gallic acid, in turn, inhibit more than 90% of the activity at concentrations of 0.25 mM. With ferulic acid and syringic acid, this inhibition percentage is obtained with a concentration of 0.5 mM (results not shown).

The inhibition results obtained are very homogeneous for fungus garden and ant samples. All of the molecules used to test inhibitory capacity are known for their ability to react as antioxidants. These compounds have a very high inhibitory capacity.

2.3. Isolation of Actinomycete Strains

This step made it possible to isolate, from ants belonging to the species *Acromyrmex octospinosus,* 15 actinomycete strains including 12 belonging to the genus *Tsukumurella*, two to the genus *Streptomyces* and one to the genus *Gordonia*. In total, 5 strains belonging to the genera *Streptomyces, Tsukumurella* and *Gordonia* were selected for the analysis of antibacterial substances.

2.4. Measurement of Antibacterial Activity

The results obtained on strain *Streptomyces* NA2B3 (Table 3) show that essential oils of thyme, cinnamon, oregano and clove have an inhibitory effect on growth. Considering that inhibition resulting in a diameter of 1.5 cm or greater is a selection criteria, the inventors identified as preferred solutions essential oils of oregano and clove causing inhibition with dilutions up to ⅕. Thyme and cinnamon are effective up to a dilution of ½.

On average, on strains isolated from fungus-growing ants (Table 4), essential oils of thyme, oregano, cinnamon and clove inhibit growth. With the exception of thyme essential oil, these oils have a deleterious action for ⅕ dilutions.

It is interesting to note that erythromycin gives similar results with regard to these two strains, namely that this antibiotic gives overall results comparable to those obtained with essential oils of thyme, cinnamon, oregano and clove.

TABLE 3

| *Streptomyces* (NA 2B3): inhibition diameter in cm | |
|---|---|
| Thyme ½ | 4.5 ± 0.6 |
| Erythromycin 20% | 3.6 ± 0.4 |
| Oregano ½ | 3.2 ± 0.4 |
| Cinnamon ½ | 2.9 ± 0.6 |
| Clove ½ | 2.4 ± 0.3 |
| Erythromycin 10% | 2.2 ± 0.3 |

TABLE 4

| Average inhibition diameters (cm) observed on the 5 actinomycete strains isolated from fungus-growing ants | |
|---|---|
| Pure thyme | 6.1 ± 1.2 |
| Pure oregano | 5.8 ± 1.1 |
| Pure cinnamon | 5.4 ± 0.6 |
| Cinnamon ½ | 4.9 ± 0.4 |
| Oregano ½ | 4.0 ± 0.3 |
| Erythromycin 20% | 3.6 ± 0.4 |
| Thyme ½ | 3.6 ± 0.3 |
| Erythromycin 10% | 3.2 ± 0.4 |
| Clove ½ | 2.9 ± 0.2 |

The results obtained from the essential oils tested show that 3 of them (thyme, oregano and cinnamon), when used undiluted, have inhibition diameters between 5.4 and 6.1 cm. Diluted to ½, the cinnamon and oregano essential oils result in growth inhibition superior to that obtained with 20% erythromycin, thereby attesting to the efficacy of these oils.

TABLE 5

| *Streptomyces* (NA 2B3): inhibition diameter in cm | |
|---|---|
| Erythromycin 20% | 4.3 ± 0.3 |
| Erythromycin 10% | 3.5 ± 0.5 |

TABLE 5-continued

| *Streptomyces* (NA 2B3): inhibition diameter in cm | |
|---|---|
| Cinnamaldehyde 20% | 3.0 ± 1.5 |
| Carvacrol 20% | 2.2 ± 0.3 |
| Thymol 20% | 1.7 ± 0.8 |

TABLE 6

| Average inhibition diameters observed on 5 actinomycete strains isolated from fungus-growing ants | |
|---|---|
| Cinnamaldehyde 20% | 4.5 ± 0.6 |
| Erythromycin 20% | 3.6 ± 0.4 |
| Erythromycin 10% | 3.2 ± 0.4 |
| Cinnamaldehyde 10% | 2.9 ± 0.6 |
| Eugenol 20% | 2.9 ± 0.7 |
| Carvacrol 20% | 2.4 ± 0.3 |
| Thymol 20% | 2.2 ± 0.3 |

The tests performed with the active molecules of the essential oils clearly show that cinnamaldehyde distinctly differs from the other molecules tested. Moreover, the results obtained with this molecule are comparable to those obtained with the reference antibiotic (erythromycin). However, the other molecules tested, namely eugenol, carvacrol and thymol, also have high levels of inhibition.

Quite surprisingly, anti-laccase activity was observed for eugenol and thymol, these compounds consequently being of particular interest for the compositions of the invention because they act on both targets identified by the inventors for controlling fungus-growing ants (data not shown).

2.5. In Situ Tests on Fungus-Growing Ants:

2.5.1. Tests of the Compositions of the Invention Over 14 Days:

2.5.1.1. Composition Comprising an Anti-Laccase Molecule:

This experiment showed that the formicidal compositions (in the form of pellets formed with starch), regardless of the type of inhibitor, are taken by the ants and that they can induce an effect of wilting of the fungus garden (whitish, yellowish or pinkish zones).

These experiments also made it possible to observe nest abandonment behaviour by the colony which could be accompanied by relocation of the fungus garden. This is confirmed by the observation of an absence of fungus garden or of fungus garden residues in the underground cavity of some nests.

In these cases, the fungus garden can be reconstructed in a second nest at a distance from the first nest.

2.5.1.2. Composition Comprising an Anti-Laccase Molecule and an Antibacterial Molecule:

Treating nests with compositions containing ascorbic acid (100 g/kg) and chloramphenicol (10 g/kg) causes all activity to disappear. Moreover, disappearance of the fungus garden and reappearance of the colony was not observed with this combination.

2.5.1.3. Effect of Carbohydrate Feeding Stimulant:

Tests with the ants showed that the flour pellets were collected quickly by the ants and confirm that the flour (consisting mainly of starch) has an attractive nature and that the compositions do not have a repellent effect. Because the ants collect the bait and import it into the nests, there is no need to apply the compositions to the colony.

2.5.1.4. Tests of the Compositions of the Invention (See Section 1.4.2.) Over Several Months:

Nests were monitored during the first two weeks (Table 7) after deposition of the formicidal combinations, then examined at 41 days (Table 8) and 4 months (Table 9) after deposition of the compositions.

TABLE 7

| Observation of nests in the 2 weeks after treatment | |
|---|---|
| | Results at 2 weeks |
| Nest observation period (number of days after deposition) | 10-14 |
| Number of nests observed | 44 |
| Number of nests with relocation of the fungus garden (%) | 29 (66%) |

Normally, a salt and pepper colour on the top of the fungus garden, white in the middle part and brown in the lower part, attest to a good vitality of the fungus garden. At the end of a 14-day period, moving (relocation) of the fungus garden is observed in 66% of the nests on all the experimental sites. Moreover, a change in the colour of the relocated fungus garden was observed: the appearance of yellowish and pinkish zones, or a completely white fungus garden with no colour gradient, was observed.

TABLE 8

| Nest observation 41 days after treatment Results at 41 days | |
|---|---|
| Number of nests observed | 38 |
| Number of dead nests | 10 (26%) |

Forty-one days after deposition of the compositions, dead nests were counted on the experimental sites (Table 8). Ten dead nests were observed on the experimental sites (26%).

TABLE 9

| Nests observation 4 months after treatment Results at 4 months | | |
|---|---|---|
| Number of dead nests | Number of live nests | Number of nests that could not be observed |
| 34 | 7 | 3 |

Four months after treatment, 77% dead nests were observed on the experimental sites. On all the sites, it thus appears that 77% of the nests were destroyed by the treatment with the compositions of the invention.

Therefore, the formicidal compositions comprising a laccase inhibitor, an antibacterial or bacteriostatic agent against commensal actinomycetes of fungus-growing ants or a combination thereof are effective in controlling fungus-growing ants by causing nest abandonment and/or destruction.

The invention claimed is:

1. A method for controlling fungus-growing ants, the method comprising administering on or around a nest of fungus-growing ants, near or on the fungus-growing ants, and/or in an area to be protected from fungus-growing ants a composition comprising at least one laccase inhibitor selected from the group consisting of ascorbic acid, citric acid, coumaric acid, ferulic acid, gallic acid, 6-1-palmitylascorbic acid, syringic acid, sodium ascorbate, calcium ascorbate, potassium ascorbate, butylhydroxyanisole, butylhydroxytoluol, cysteine, octyl gallate, dodecyl gallate, glutathione, sodium lactate, potassium lactate, calcium lactate, lecithins, lipoate, carotenoids, carotene, sodium tartrate, potassium tartrate, sodium thiosulfate, vitamin E, synthetic α-tocopherol, synthetic γ-tocopherol, synthetic δ-tocopherol, selenium, hydroxylammonium chloride, ethylenediaminetetraacetic acid, calcium chloride, rhodotorulic acid, enterobactin, diethyldithiocarbamic acid, sodium azide, cetyltrimethylammonium bromide, sodium lauryl sulphate, sodium cyanide, sodium thiosulphate, oxalic acid, thioglycolic acid, diethyldithiocarbamic acid, $Fe^{2+}$, $Cu^{2+}$, $Ag^{+}$, $Li^{+}$, $Sn^{+}$, $Hg^{+}$, $Mn^{2+}$, $Zn^{2+}$, $Al^{3+}$, thymol, and eugenol;

wherein the fungus-growing ants are killed and/or forced to abandon the nest after coming into contact with the at least one laccase inhibitor.

2. The method according to claim 1, wherein the composition further comprises at least one antibacterial compound selected from the group consisting of an antibiotic, carvacrol, cinnamaldehyde, α-terpineol, and terpinen-4-ol.

3. The method according to claim 2, wherein the antibiotic is selected from the group consisting of β-lactams, tetracyclines, quinolones, macrolides, glycopeptides, and aminoglycosides.

4. The method according to claim 1, wherein the at least one laccase inhibitor is selected from the group consisting of ascorbic acid, citric acid, coumaric acid, ferulic acid, syringic acid, gallic acid, cysteine, glutathione, lecithins, lipoate, the carotenoid lutein the carotenoid luteolin, lycopene, sodium thiosulphate, vitamin E, α-tocopherol, γ-tocopherol, δ-tocopherol, selenium and hydroxylammonium chloride.

5. The method according to claim 2, wherein the antibacterial compound is selected from the group consisting of cinnamaldehyde, thymol, eugenol, and carvacrol.

6. The method according to claim 1, wherein the at least one laccase inhibitor further possesses bactericidal and/or bacteriostatic activity against actinomycetes present in the fungus garden and on the ants.

7. The method according to claim 2, wherein the composition comprises (i) the at least one laccase inhibitor selected from the group consisting of
(a) ascorbic acid,
(b) thymol,
(c) eugenol,
(d) sodium thiosulfate,
(e) L-cysteine, and
(f) glutathione; or (ii) at least one combination of compounds selected from the group consisting of
(g) thymol and L-cysteine,
(h) eugenol and L-cysteine,
(i) cinnamaldehyde and L-cysteine,
(j) thymol and sodium thiosulfate,
(k) eugenol and sodium thiosulfate,
(l) cinnamaldehyde and sodium thiosulfate,
(m) thymol and glutathione,
(n) eugenol and glutathione, and
(o) cinnamaldehyde and glutathione.

8. The method according to claim 1, wherein the composition further comprises at least one oligosaccharide feeding stimulant or at least one polysaccharide feeding stimulant.

9. The method according to claim 8, wherein the at least one oligosaccharide feeding stimulant or at least one polysaccharide feeding stimulant is selected from the group consisting of starch, amylose, laminarin, maltodextrin, and glycogen.

10. A fungus-growing ant formicidal composition consisting of (i) at least one laccase inhibitor selected from the group consisting of coumaric acid, 6-1-palmitylascorbic acid, syringic acid, sodium ascorbate, calcium ascorbate, potassium ascorbate, butylhydroxyanisole, butylhydroxytoluol, octyl gallate, dodecyl gallate, glutathione, sodium lactate, potassium lactate, calcium lactate, lipoate, carotenoids, carotenes, sodium tartrate, potassium tartrate, selenium, calcium chloride, rhodotorulic acid, enterobactin, diethyldithiocarbamic acid, sodium azide, sodium lauryl sulphate, sodium cyanide, sodium thiosulphate, oxalic acid, thioglycolic acid, diethyldithiocarbamic acid, thymol, eugenol, glutathione, $Fe^{2+}$, $Cu^{2+}$, $Ag^{+}$, $Sn^{+}$, $Hg^{+}$, $Mn^{2+}$, $Zn^{2+}$, and $Al^{3+}$;

(ii) an antibacterial compound selected from the group consisting of an antibiotic, carvacrol, cinnamaldehyde, α-terpineol, and terpinen-4-ol; and (iii) an oligosaccharide feeding stimulant or a polysaccharide feeding stimulant;

wherein the formicidal composition exhibits colony destroying activity against the fungus-growing ants and/or killing activity against both the fungus-growing ants and the fungus.

11. The fungus-growing ant formicidal composition of claim 10, wherein the composition comprises at least one combination of compounds selected from the group consisting of
(i) thymol and sodium thiosulfate,
(ii) eugenol and sodium thiosulfate,
(iii) cinnamaldehyde and sodium thiosulfate,
(iv) thymol and glutathione,
(v) eugenol and glutathione, and
(vi) cinnamaldehyde and glutathione.

12. The fungus-growing ant formicidal composition according to claim 10, wherein the at least one oligosaccharide feeding stimulant or the at least one polysaccharide feeding stimulant is selected from the group consisting of starch, amylose, laminarin, maltodextrin, and glycogen.

13. The fungus-growing ant formicidal composition according to claim 10, wherein the at least one laccase inhibitor exhibits both (i) laccase inhibitor activity against laccases present in the fungus garden and in the ants, and (ii) bactericidal and/or bacteriostatic activity against actinomycetes present in the fungus garden and on the ants.

14. The formicidal composition according to claim 10, wherein the antibacterial compound is present in a concentration from 1 g/kg to 200 g/kg of the formicidal composition, and the at least one laccase inhibitor is present in a concentration from 1 g/kg to 200 g/kg of the formicidal composition.

15. The fungus-growing ant formicidal composition according to claim 10, wherein the oligosaccharide feeding stimulant or the polysaccharide feeding stimulant is present in a concentration from 600 g/kg to 999 g/kg of the formicidal composition.

16. The fungus-growing ant formicidal composition according to claim 10, wherein the oligosaccharide feeding stimulant or the polysaccharide feeding stimulant is present in a concentration from 800 g/kg to 999 g/kg of the formicidal composition, and the at least one laccase inhibitor is present in a concentration from 1 g/kg to 200 g/kg of the formicidal composition.

17. The method according to claim 1, wherein the at least one laccase inhibitor is selected from the group consisting of ascorbic acid, citric acid, coumaric acid, ferulic acid, syringic acid, gallic acid, 6-1-palmitylascorbic acid, sodium ascorbate, calcium ascorbate, potassium ascorbate, butylhydroxyanisole, butylehydroxytoluol, cysteine, octyl gallate, dodecyl gallate, glutathione, sodium lactate, potassium lactate, calcium lactate, lecithins, lipoate, carotenoids, carotene, sodium tartrate, sodium thiosulphate, vitamin E, synthetic α-tocopherol, synthetic γ-tocopherol, synthetic δ-tocopherol, selenium, and hydroxylammonium chloride.

18. The method according to claim 6, wherein the at least one laccase inhibitor is thymol or eugenol.

19. The method according to claim 1, wherein the fungus-growing ants comprise a colony of fungus-growing ants, and the colony is destroyed after the fungus-growing ants come into contact with the at least one laccase inhibitor.

* * * * *